United States Patent
Hazu et al.

(10) Patent No.: US 12,044,812 B2
(45) Date of Patent: Jul. 23, 2024

(54) SCINTILLATOR AND RADIATION DETECTOR

(71) Applicants: Mitsubishi Chemical Corporation, Tokyo (JP); TOHOKU UNIVERSITY, Miyagi (JP)

(72) Inventors: Koji Hazu, Tokyo (JP); Keiji Yamahara, Tokyo (JP); Shunsuke Kurosawa, Miyagi (JP); Akira Yoshikawa, Miyagi (JP)

(73) Assignees: Mitsubishi Chemical Corporation, Tokyo (JP); Tohoku University, Miyagi (JP)

( * ) Notice: Subject to any disclaimer, the term of this patent is extended or adjusted under 35 U.S.C. 154(b) by 0 days.

(21) Appl. No.: 18/372,820

(22) Filed: Sep. 26, 2023

(65) Prior Publication Data

US 2024/0019592 A1    Jan. 18, 2024

Related U.S. Application Data

(63) Continuation of application No. PCT/JP2022/011677, filed on Mar. 15, 2022.

(30) Foreign Application Priority Data

Mar. 26, 2021 (JP) ................. 2021-053963

(51) Int. Cl.
   *G01T 1/202* (2006.01)
   *C01G 27/00* (2006.01)
   *G01T 1/20* (2006.01)

(52) U.S. Cl.
   CPC ............ *G01T 1/2023* (2013.01); *C01G 27/00* (2013.01); *G01T 1/2018* (2013.01); *C01P 2002/34* (2013.01); *C01P 2002/52* (2013.01)

(58) Field of Classification Search
   None
   See application file for complete search history.

(56) References Cited

U.S. PATENT DOCUMENTS

| | | | |
|---|---|---|---|
| 5,698,857 | A | 12/1997 | Lambert et al. |
| 2003/0193040 | A1 | 10/2003 | Venkataramani et al. |

(Continued)

FOREIGN PATENT DOCUMENTS

| | | |
|---|---|---|
| CN | 1451439 A | 10/2003 |
| CN | 103249805 A | 8/2013 |

(Continued)

OTHER PUBLICATIONS

Van Loef et al., "Scintillation Properties of SrHfO3:Ce3+ and BaHfO3:Ce3+ Ceramics," IEEE Transactions on Nuclear Science, 54 (3): 741-743 (2007).

(Continued)

*Primary Examiner* — Edwin C Gunberg
(74) *Attorney, Agent, or Firm* — Morgan, Lewis & Bockius LLP

(57) ABSTRACT

A scintillator, having a composition represented by the following general formula (1), including a substitution element A, the substitution element A comprising at least La, and a total molar content of the substitution element A being 0.00001 mol or more and 0.05 mol or less in 1 mol of the scintillator, and further including an activator element B, the activator element B being constituted from Ce, having a perovskite-type crystal structure, and exhibiting a linear transmittance of light at a wavelength of 800 nm, at a thickness of 1.9 mm, of 30% or more. $QM_xO_{3y}$ ... (1): wherein Q represents one or more elements selected from the group consisting of Ca, Sr and Ba; M represents Hf; Q and M are each optionally substituted with other element at (Continued)

a proportion of 20% by mol or less; and x and y respectively satisfy $0.5 \leq x \leq 1.5$ and $0.7 \leq y \leq 1.5$.

19 Claims, 4 Drawing Sheets

(56) References Cited

U.S. PATENT DOCUMENTS

| 2010/0327227 A1 | 12/2010 | Kurata et al. |
| 2013/0327986 A1 | 12/2013 | Blahuta et al. |

FOREIGN PATENT DOCUMENTS

| JP | 2012-046642 A | 3/2012 |
| JP | 2014-013216 A | 1/2014 |
| JP | 2014-505742 A | 3/2014 |
| JP | 2015-038219 A | 2/2015 |
| JP | 5674385 B2 | 2/2015 |
| JP | 2015-151535 A | 8/2015 |
| JP | 2016-056378 A | 4/2016 |
| TW | 201521685 A | 6/2015 |

OTHER PUBLICATIONS

Grezer et al., "BaHfO3:Ce sintered ceramic scintillators," Radiation Measurements, 45: 386-388 (2010).

Yahaba et al., "X-ray detection capability of a Cs2ZnCl4 single-crystal scintillator," Applied Physics Express, 7: 062602 (2014).

Van Loef et al., "Scintillation properties of LaBr3:Ce3+ crystals: fast, efficient and high-energy-resolution scintillators," Nuclear Instruments and Methods in Physics Research A, 486: 254-258 (2002).

Dobrowolska et al., "The mechanism of X-ray excited luminescence in BaHfO3 doped with Eu3+, Y3+ or Eu3+, La3+," Journal of Luminescence, 192: 397-403 (2017).

Mihokova et al., "Optical and Structural Properties of Pb and Ce Doped SrHfO3 Powders," IEEE Transactions on Nuclear Science, 57 (3): 1245-1250 (2010).

Dobrowolska et al., "Forcing Eu3+ into Different Positions in the BaHfO3 Host and Its Spectroscopic Consequences," Chemistry of Materials, 22 (16): 4652-4659 (2010).

Zhu et al., "Fine-grained Ce, Y:SrHfO3 Scintillation Ceramics Fabricated by Hot Isostatic Pressing," Journal of Inorganic Materials, 36 (10): 1118-1124 (2021).

International Search Report issued in related International Patent Application No. PCT/JP2022/011677 dated May 31, 2022.

Office Action issued in corresponding Japanese application No. 2021-053963 dated Jun. 1, 2021.

Office Action issued in corresponding Japanese application No. 2021-053963 dated Jul. 13, 2021.

Written Opinion issued in related International Patent Application No. PCT/JP2022/011677 dated May 31, 2022.

Decision to Grant issued in corresponding Japanese Patent Application No. 2021-053963 dated Aug. 17, 2021.

International Preliminary Report on Patentability and Written Opinion issued in corresponding International Patent Application No. PCT/JP2022/011677 dated Oct. 5, 2023.

Office Action and Search Report issued Apr. 4, 2024 for Chinese Application No. 202280024971.2.

Extended European Search Report issued May 10, 2024 for European Application No. 22775289.6.

SCINTILLATOR AND RADIATION DETECTOR

CROSS-REFERENCE TO RELATED APPLICATION

This is a continuation of International Application PCT/JP2022/011677, filed on Mar. 15, 2022, and designated the U.S., and claims priority from Japanese Patent Application 2021-053963 which was filed on Mar. 26, 2021, the entire contents of which are incorporated herein by reference.

TECHNICAL FIELD

The present invention relates to a scintillator to be used in a scintillation detector of radiation such as γ-ray, for a high-count rate radiation detection apparatus, for example, a positron emission tomography (PET) apparatus.

BACKGROUND $Lu_2SiC_5$, $Gd_3(Ga, Al)_5O_{12}$, $Gd_2Si_2O_7$, and the like are known as representative scintillators for detection of radiation. In research and development in the present field, scintillator characteristics have been tried to be improved based on structures of these compounds by a method involving substituting a matrix atom with a congener atom or a method involving co-adding impurity atoms different in valences together with a light-emission center atom (Patent Documents 1 to 3).

In accordance with recent popularization of silicon photomultipliers, scintillators short in fluorescence decay time (DT) have been demanded for an enhancement in space resolution due to time resolution, and, for example, it has been reported that a DT of about 30 to 40 ns is achieved by use of a lutetium orthosilicate-based scintillator to which Ca is added (Non Patent Document 2).

In addition, hafnate-based scintillators such as $SrHfO_3$ and $BaHfO_3$ have been reported as scintillators shorter in DT (Non Patent Documents 1 and 2). These scintillators each contain an element having a large atomic number, such as Lu or Hf, and thus have a large effective atomic number of 63 to 64 and also have a high density of 7.5 g/cm³ or more, and thus have high radiation stopping power. In addition, these scintillators each have no deliquescence and are easily handled.

In this regard, while, for example, $Cs_2ZnCl_4$ (Patent Document 4, and Non Patent Document 3) and $LaBr_3$ to which Ce is added (Non Patent Document) 4) have been additionally reported as scintillators very short in DT, these scintillators have small effective atomic numbers of 48 in both the cases of $Cs_2ZnCl_4$ and $LaBr_3$ and also low densities of about 3 g/cm³ and 5.3 g/cm³ in the respective cases of $Cs_2ZnCl_4$ and $LaBr_3$, and also have low radiation stopping power. In addition, such a halide-based scintillator such as $LaBr_3$ has high deliquescence and is often difficult to handle.

RELATED ART DOCUMENT

Patent Document

Patent Document 1: Japanese Patent No. 5674385
Patent Document 2: Japanese Unexamined Patent Publication No. 2016-56378
Patent Document 3: Japanese Unexamined Patent Publication No. 2015-151535
Patent Document 4: Japanese Unexamined Patent Publication No. 2014-13216

Non Patent Document

NON Patent Document 1: Scintillation Properties of SrHfO3: Ce3+ and BaHfO3: Ce3+ Ceramics, E. V. van Loef, W. M. Higgins, J. Glodo, C. Brecher, A. Lempicki, V. Venkataramani, W. W. Moses, S. E. Derenzo, and K. S. Shah, IEEE Transactions on Nuclear Science, 54, 741-743 (2007).
Non Patent Document 2: BaHfO3: Ce sintered ceramic scintillators, A. Grezer, E. Zych, and L. Lepinski, Radiation Measurements, 45, 386-388 (2010).
Non Patent Document 3: X-ray detection capability of a Cs2ZnCl4 single-crystal scintillator, Natsuna Yahaba, Masanori Koshimizu, Yan Sun, Takayuki Yanagida, Yutaka Fujimoto, Rie Haruki, Fumihiko Nishikido, Shunji Kishimoto, and Keisuke Asai, Applied Physics Express, 7, 062602 (2014).
Non Patent Document 4: E. V. D. van Loef, P. Dorenbos, C. W. E. van Eijk, K. W. Kr.amer, H. U. G.udel, Nuclear Instruments and Methods in Physics Research A, 486, 254-258 (2002).

SUMMARY OF THE INVENTION

Problems to be Solved by the Invention

While scintillators are used in instruments for non-destructive inspection, the industry field, the medical field, and the like, a scintillator exhibiting favorable translucency, having a higher light output, and having a shorter decay time is demanded in all such instruments.

Means for Solving the Problems

The present inventors have made intensive studies in view of the above problems, and as a result, have found that the above problems can be solved by use of a hafnate-based scintillator containing a specified element in an appropriate amount, and thus have completed the present invention.

In other words, the present invention includes the following in any embodiment.

[1]
A scintillator,
having a composition represented by the following general formula (1), $$QM_xO_{3y} \qquad (1)$$

wherein Q represents one or more elements selected from the group consisting of Ca, Sr and Ba;
M represents Hf;
Q and M are each optionally substituted with other element at a proportion of 20% by mol or less; and
x and y respectively satisfy $0.5 \leq x \leq 1.5$ and $0.7 \leq y \leq 1.5$;
comprising a substitution element A, the substitution element A comprising at least one or more elements selected from the group consisting of Na, Cd, Pb, Tl, Sm, and La, and a total molar content of the substitution element A being mol or more and 0.05 mol or less in 1 mol of the scintillator,
having a perovskite-type crystal structure, and
exhibiting a linear transmittance of light at a wavelength of 800 nm, at a thickness of 1.9 mm, of 30% or more.

[2]
The scintillator according to [1], comprising at least La as the substitution element A.
[3]
The scintillator according to [1] or [2], further comprising one or more elements selected from the group consisting Ce, Pr, Nd, Eu, Tb, Er and Yb, as an activator element B.
[4]
The scintillator according to [3], wherein, when the total molar content of the substitution element A and the total molar content of the activator element B, contained in 1 mol of the scintillator, are designated respectively as a and b, a+b satisfies 0.0055 mol or more and 0.024 mol or less.
[5]
The scintillator according to [3] or [4], wherein, when the total molar content of the substitution element A and the total molar content of the activator element B, contained in 1 mol of the scintillator, are designated respectively as a and b, [a+(b×1.8)] satisfies 0.006 mol or more and 0.03 mol or less.
[6]
The scintillator according to any of [1] to [5], wherein the scintillator is a single crystal or a sintered body.
[7]
The scintillator according to any of [1] to [6], having a columnar shape, a flat plate shape or a curved plate shape, and having a height of 1 mm or more.
[8]
The scintillator according to any of [1] to [7], wherein a linear transmittance of light at a wavelength of 390 nm, at a thickness of 1.9 mm, is 3% or more.
[9]
The scintillator according to any of [1] to [8], wherein a fluorescence decay time is 20 ns or less.
[10]
The scintillator according to any of [1] to [9], wherein, when the maximum value of a fluorescence intensity in irradiation with γ-ray is 100%, a fluorescence intensity at a time point after 100 ns from a time point at which a fluorescence intensity reaches the maximum value is 3% or less.
[11]
A radiation detector comprising the scintillator according to any of [1] to [10].
[12]
A radiation inspection apparatus comprising the radiation detector according to [11].
[13]
A method for producing a scintillator, the method comprising:
mixing a raw material to obtain a raw material mixture; and
heat-treating the raw material mixture to obtain a synthetic powder, wherein
the raw material contains at least $HfO_2$ having a purity of 99.0% by mol or less, and
the scintillator
is a scintillator represented by the following general formula (1), $$QM_xO_{3y} \quad (1)$$

wherein
Q represents one or more elements selected from the group consisting of Ca, Sr and Ba;
M represents Hf;
Q and M are each optionally substituted with other element at a proportion of 20% by mol or less; and
x and y respectively satisfy $0.5 \leq x \leq 1.5$, and $0.7 \leq y \leq 1.5$;

comprises a substitution element A, the substitution element A comprising at least one or more elements selected from the group consisting of Na, Cd, Pb, Tl, Sm, and La, contains a total molar content of the substitution element A being 0.00001 mol or more and 0.05 mol or less in 1 mol of the scintillator,
has a perovskite-type crystal structure, and
exhibits a linear transmittance of light at a wavelength of 800 nm, at a thickness of 1.9 mm, of 30% or more.
[14]
The method for producing a scintillator according to [13], further comprising:
pressure-molding the synthetic powder to obtain a pressure-molded body; and
firing the pressure-molded body to obtain a fired product.
[15]
The method for producing a scintillator according to [13], further comprising:
pressure-molding the synthetic powder to obtain a pressure-molded body;
firing the pressure-molded body to obtain a fired product; and
annealing the fired product, after the firing.

Effects of the Invention

The present invention can provide a scintillator exhibiting favorable translucency and having a high light output and a short decay time, and a method for producing the scintillator. The present invention can also provide a radiation detector and a radiation inspection apparatus each having a high light detection efficiency, by use of the scintillator.

MODE FOR CARRYING OUT THE INVENTION

Figure 1:
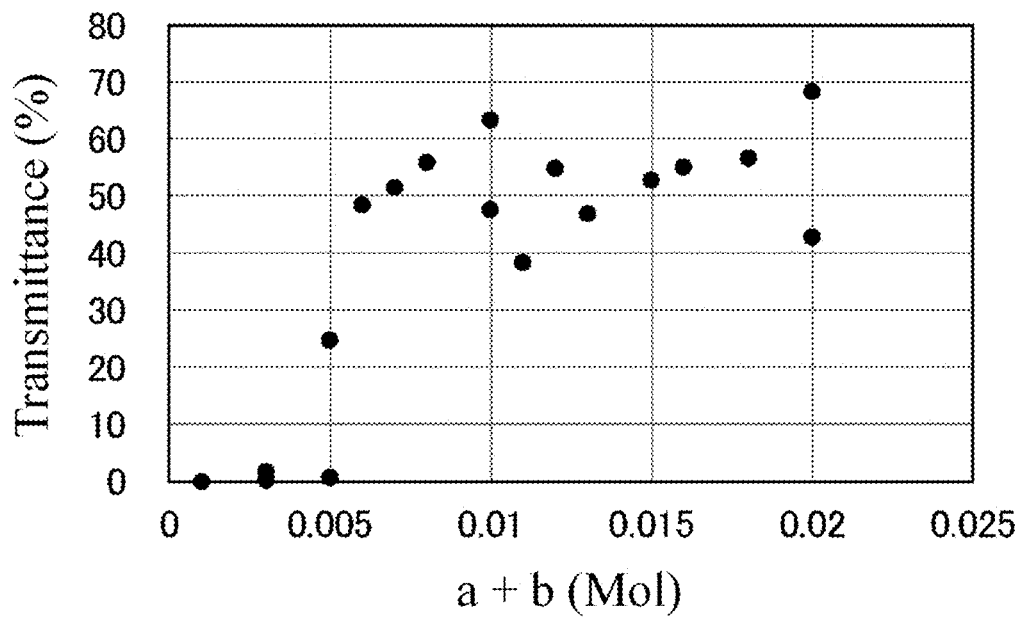
FIG. 1 is a graph illustrating a relationship between the value of a+b and the linear transmittance of light at a wavelength of 800 nm, at a thickness of 1.9 mm, with respect to a scintillator obtained in Examples.

Hereinafter, embodiments of the present invention are described in detail, but this description is one example (representative example) of embodiments of the present invention, and the present invention is not limited to these contents without departing from the gist thereof.
Herein, a numerical value range expressed with "to" means a range including numerical values described before and after "to", as the lower limit value and the upper limit value, and the "A to B" means A or more and B or less.
[Scintillator]
A scintillator according to one embodiment of the present invention (hereinafter, also simply referred to as "scintillator") is represented by the following general formula (1).

$$QM_xO_{3y} \quad (1)$$

In the general formula (1), Q represents one or more elements selected from the group consisting of Ca, Sr and Ba, M represents Hf, Q and M are each optionally substituted with other element at a proportion of 20% by mol or less, and x and y respectively satisfy $0.5 \leq x \leq 1.5$, $0.7 \leq y \leq 1.5$.

The crystal structure of the scintillator is preferably a perovskite type structure.

Q and M are each optionally partially substituted with other element.

In an embodiment where Q or M is partially substituted with other element, the total proportion of such other element included in Q or M is usually 20% by mol or less, preferably 15% by mol or less, more preferably 12% by mol or less, further preferably 10% by mol or less, more further preferably 5% by mol or less, and is usually 0.0005% by mol or more, under the assumption that the entire Q or the entire M corresponds to 100% by mol.

In the general formula (1), x satisfies $0.5 \leq x \leq 1.5$, preferably $0.7 \leq x$, more preferably $0.9 \leq x$, preferably $x \leq 1.3$, more preferably $x \leq 1.1$, from the viewpoint of stabilization of the crystal structure and from the viewpoint of a decrease in fluorescence decay time.

In the general formula (1), y satisfies $0.7 \leq y \leq 1.5$, preferably $0.8 \leq y$, more preferably $0.9 \leq y$, preferably $y \leq 1.3$, more preferably $y \leq 1.1$, from the viewpoint of stabilization of the crystal structure and from the viewpoint of a decrease in fluorescence decay time.

<Q Element>

In one embodiment, Q in the general formula (1) represents one or more elements selected from the group consisting of Ca, Sr and Ba. Q preferably represents including Ba from the viewpoint of a decrease in fluorescence decay time.

In the present embodiment, Q in a perovskite type compound satisfying the $QM_xO_{3y}$ composition of the formula (1) usually represents a metal element whose valence is monovalent, divalent or trivalent and which can be present in a crystal, in the form of a 12-coordinated ion, and represents, for example, one or more elements selected from the group consisting of K, Rb, Cs, Ra, and an alkali earth metal.

Q preferably includes one or more alkali earth metal elements, more preferably consists of one or more alkali earth metal elements, from the viewpoint of stabilization of the crystal structure.

Q includes one or more elements selected from the group consisting of Ca, Sr, and Ba, more preferably consists of one or more elements selected from the group consisting of Ca, Sr, and Ba, from the viewpoint of a decrease in fluorescence decay time.

In a case where Q includes one or more alkali earth metal elements, the total proportion of the alkali earth metal element(s) included in Q is usually 50% by mol or more, preferably 60% mol or more, more preferably 70% by mol or more, further preferably 80% by mol or more, more further preferably 90% by mol or more, more further preferably 95% by mol or more, or may be 100% by mol and is usually 100% by mol or less.

Q can include appropriate type(s) and amount(s) of alkali earth element(s), to thereby obtain the effect of, for example, allowing the scintillator to be decreased in fluorescence decay time and stabilized in crystal structure.

Q preferably includes one or more elements selected from the group consisting of Ca, Sr, and Ba, more preferably Ba, from the viewpoint of a decrease in fluorescence decay time.

In a case where Q includes Ba, the proportion of Ba included in Q is usually 50% by mol or more, preferably 60% by mol or more, more preferably 70% by mol or more, further preferably 80% by mol or more, more further preferably 90% by mol or more, more further preferably 95% or more, or may be 100% by mol and is usually 100% by mol or less, from the viewpoint of a decrease in fluorescence decay time.

Q may include two or more alkali earth metal elements, and preferably includes two or more alkali earth metal elements selected from the group consisting of Ca, Sr and Ba, in the present embodiment.

Q includes at least Ba, and further includes other one or more alkali earth metal elements, from the viewpoint of a decrease in fluorescence decay time. Q can include two or more alkali earth metal elements in appropriate amounts, to thereby allow the scintillator to be further reduced in fluorescence decay time.

In a case where Q includes two alkali earth elements Q1 and Q2, Q1:Q2 (molar ratio) is usually in the range of to 99.99:0.01, preferably 10:90 to 95:5, more preferably 20:80 to 80:20, further preferably 30:70 to 70:30, particularly preferably 40:60 to 60:40, from the viewpoint of a decrease in fluorescence decay time.

In an embodiment where Q includes three or more alkali earth metal elements, Q includes Ca, Sr and Ba, from the viewpoint of a decrease in fluorescence decay time. The molar contents of such alkali earth metal elements are not limited from the viewpoint of stabilization of the crystal structure as long as the total thereof is in the range of 50% by mol or more and 100% by mol or less under the assumption that the entire Q corresponds to 100% by mol, and the molar contents are each independently usually 0.01% by mol or more, preferably 10% by mol or more, more preferably 20% by mol or more, or may be 30% by mol or more, and are each independently usually 99.99% by mol or less, preferably 90% by mol or less, more preferably 80% by mol or less, or may be 70% by mol or less.

The types, rates and contents of such alkali earth metal elements can be appropriately adjusted, to thereby obtain the scintillator, which exhibits a very short fluorescence decay time.

In one embodiment, Q is optionally partially substituted with other element. Examples of such other element include a substitution element A and an activator element B described below, and Zr, Al, and Mg described below.

In a case where Q is partially substituted with such other element, the proportion of the element group in Q is usually 20% by mol or less, preferably 15% by mol or less, more preferably 12% by mol or less, further preferably 10% by mol or less, more further preferably 5% by mol or less under the assumption that the entire Q corresponds to 100% by mol, from the viewpoint of stabilization of the crystal structure, and the lower limit is not particularly limited and is usually 0.0005% by mol or more.

In a case where Q is partially substituted with such other element, the description "Q represents a specified element" herein means that Q includes such a specified element substantially as a main component, and may be read as having such a meaning.

<M Element>

In one embodiment, M in the general formula (1) represents any element other than Q, preferably Hf.

In one embodiment, M in a perovskite type compound satisfying the $QM_xO_{3y}$ composition of the formula (1) usually corresponds to one around which six oxygen atoms are coordinated in a crystal, and thus includes a 6-coordinated metal element which is present in the form of a divalent to hexavalent, preferably trivalent to pentavalent cation, and, for example, Mg, Al, and metal elements in Groups 3 to 15, belonging to the fourth to sixth periods in the periodic table, except for lanthanoid, can be used provided that such an element is different from that of Q, and, for example, one or more metal elements selected from the group consisting of Ti, V, Cr, Mn, Fe, Co, Ni, Cu, Zn, Ga, Ge, As, Se, Nb, Mo, Tc, Ru, Rh, Pd, In, Sn, Ag, Sb, Te, Hf, Ta, W, Re, Os, Ir, Pt, Au, Tl, and Pb can be used.

Such an element constituting M is a metal element capable of being in the form of preferably a trivalent to pentavalent cation, more preferably a tetravalent cation, from the viewpoint of an improvement in charge balance of the entire scintillator.

The metal element in the form of an ion in a crystal has an ion radius of usually 0.4 Å or more, preferably 0.5 Å or more, and usually 1.1 Å or less, preferably 0.9 Å or less, more preferably 0.8 Å or less, from the viewpoint of stabilization of the crystal structure.

The atomic number of such an element constituting M is more preferably larger from the viewpoint of an increase in radiation detection efficiency of the scintillator, and is usually 20 or more, preferably 30 or more, more preferably 40 or more, further preferably 50 or more, more further preferably 60 or more, more further preferably 70 or more, and the upper limit is not particularly limited and is usually 85 or less.

The main component of M preferably corresponds to one or more elements selected from the group consisting of Nb, Mo, Tc, Ru, Rh, Pd, In, Sn, Ag, Hf, Ta, W, Re, Os, Ir, Pt, and Pb, more preferably one or more elements selected from the group consisting of Nb, Mo, Pd, Ag, Hf, Ta, W, and Pb, further preferably one or more elements selected from the group consisting of Nb, Mo, Hf, Ta, W, and Pb, from the above viewpoints.

M preferably includes at least Hf, more preferably represents Hf, from the viewpoints of stabilization of the crystal structure and an enhancement in radiation detection efficiency.

In an embodiment where M includes Hf, the proportion of Hf included in M is usually 50% mol or more, preferably 60% by mol or more, more preferably 70% by mol or more, further preferably 80% by mol or more, more further preferably 90% by mol or more, more further preferably 95% by mol or more, or may be 100% by mol and is usually 100% by mol or less. M can include a sufficient proportion of Hf, to thereby increase the effective atomic number of the entire scintillator, thereby obtaining the scintillator, which has radiation stopping power and thus a good radiation detection efficiency.

In one embodiment, M is optionally partially substituted with other element. Examples of such other element include a substitution element A and an activator element B, and Zr, Al, and Mg described below.

In a case where M is partially substituted with such other element, the proportion of the element group in M is usually 20% by mol or less, preferably 15% by mol or less, more preferably 12% by mol or less, further preferably 10% by mol or less, more further preferably 5% by mol or less under the assumption that the entire M corresponds to 100% by mol, from the viewpoint of stabilization of the crystal structure, and the lower limit is not particularly limited and is usually 0.0005% by mol or more.

In a case where M is partially substituted with such other element, the description "M represents a specified element" herein means that M includes such a specified element substantially as a main component, and may be read as having such a meaning.

<Substitution Element A>

The scintillator includes a substitution element A. The scintillator includes a substitution element A, and thus the scintillator, which is enhanced in density during sintering and which exhibits favorable translucency, can be obtained.

The substitution element A includes one or more elements selected from the group consisting of Na, Cd, Pb, Tl, Sm, and La. The scintillator preferably includes one or more elements selected from the group consisting of Na, Sm, and La, as the substitution element A, from the viewpoint of safety, and more preferably includes La from the viewpoint of stabilization of the crystal structure, and the substitution element A is further preferably La.

In one embodiment, the substitution element A includes La, and the proportion of La included in the substitution element A is usually 50% by mol or more, preferably 60% by mol or more, more preferably 70% by mol or more, further preferably 80% by mol or more, more further preferably 90% by mol or more, and usually 100% by mol or less.

The substitution element A may be present as any mode in the scintillator or may be included in the entire scintillator, as long as the scintillator, which exhibits high translucency, is obtained. It can be confirmed by a procedure such as GD-MS or ICP emission spectroscopic analysis that the substitution element A is included in the entire scintillator.

In one embodiment, the substitution element A is included in any one of Q or M, or in both Q and M. The method for confirming whether or not the substitution element A is included in Q and M is not particularly limited, and such confirmation can be made by an ordinary method and can be, for example, made by using ZAFS or ZANES spectral analysis to thereby perform comparison with a spectrum of a reference element and then analyze the charge state of a target element, and its surrounding state.

In one embodiment, at least one portion of the substitution element A is included in Q, in a 12-coordinated state.

The content of the substitution element A is usually 0.00001 mol or more, preferably 0.0001 mol or more, more preferably 0.0005 mol or more, further preferably 0.001 mol or more, particularly preferably 0.003 mol or more, still further preferably 0.004 mol or more, particularly preferably 0.005 mol or more, and usually 0.05 mol or less, preferably 0.03 mol or less, more preferably 0.02 mol or less, further preferably 0.015 mol or less, particularly preferably 0.0125 mol or less, most preferably 0.01 mol or less, under the assumption that the entire scintillator corresponds to 1 mol.

The scintillator includes appropriate type and amount of the substitution element A, and thus the scintillator or a sintered body scintillator, which has a high relative density and high translucency, can be obtained.

The reason why the scintillator includes the substitution element A to result in improvements in density and translucency is not clear, and is presumed to be due to the occurrence of reduced voids in the case of simultaneous enhancements in density and translucency.

<Activator Element B>

The scintillator represented by the general formula (1) may further include other element B as an activator, in addition to Q, M, and O. Herein, the element included as the activator is also referred to as "activator element B".

The scintillator can include an activator element B, to thereby obtain the scintillator, which includes an activator element B serving as a light emission center and which has a high light output.

The activator element B here used can be any rare-earth element except for La and Sm, and preferably includes one or more selected from the group consisting of Ce, Pr, Nd, Eu, Tb, Er and Yb. Ce is more preferably included from the viewpoint of providing a short fluorescence decay time. In a specified embodiment, the activator element B is Ce. Any of such elements may be used in order to obtain an objective light emission spectrum, or such elements may be combined to thereby regulate a light emission spectrum.

The scintillator can include appropriate type and amount of such an activator element, and thus the scintillator, in which light emission characteristics such as a light emission spectrum are optimized depending on the intended object, can be obtained.

The activator element B may be present in any mode in the scintillator as long as the scintillator exhibits favorable light emission characteristics, and the activator element B may be included in the entire scintillator. It can be confirmed by a procedure such as GD-MS or ICP emission spectroscopic analysis that the activator element B is included in the entire scintillator.

In one embodiment, the activator element B is included in any one of Q or M, or in both Q and M. The method for confirming whether or not the activator element B is included in Q and M is particularly limited and such confirmation can be made by an ordinary method, and, for example, whether the activator element B substitutes a site of Q or a site of M can be confirmed by using ZAFS or ZANES spectral analysis to thereby perform comparison with a spectrum of a reference element and then analyze the charge state of a target element, and its surrounding state.

The content of the activator element B is not limited. For example, the content is usually 0.01 mol or less, more preferably 0.005 mol or less, further preferably 0.002 mol or less under the assumption that the entire scintillator corresponds to 1 mol. The lower limit is not particularly limited, and is usually 0.00001 mol or more, more preferably 0.0001 mol or more.

In a case where the activator element B is included in Q, the content of the activator element B is usually 0.0001 mol or more and 0.05 mol or less, preferably 0.001 mol or more and 0.02 mol or less under the assumption that the entire Q corresponds to 1 mol, and in a case where the activator element B is included in M, the content of the activator element B is usually 0.00001 mol or more, and usually 0.05 mol or less, preferably 0.01 mol or less, more preferably 0.001 mol or less under the assumption that the entire M corresponds to 1 mol.

The content of the activator element B is equal to or more than the lower limit, and thus the activator element B can serve as a light emission center to thereby obtain the scintillator, which exhibits favorable light emission intensity. The content is equal to or less than the upper limit, and thus the scintillator, which can be reduced in rate of absorption in a light emission wavelength band and exhibits favorable light emission intensity, can be obtained.

In a case where the total molar content of the substitution element A and the total molar content of the activator element B included in the scintillator are respectively designated as a and b, the value of a+b in the scintillator is usually 0.002 mol or more, preferably 0.0055 mol or more, more preferably 0.007 mol or more, and usually less than 0.1 mol, preferably less than 0.05 mol, more preferably less than 0.025 mol, further preferably 0.024 mol or less, particularly preferably 0.023 mol or less, still further preferably 0.022 mol or less, most preferably 0.02 mol or less, under the assumption that the entire scintillator corresponds to 1 mol. Here, b may be 0 mol.

The value of a+b is within the range, and thus the scintillator, which can be reduced in scattering of fluorescence in the scintillator and has high translucency, can be provided.

The value of [a+(b×1.8)] with respect to a and b described above, in terms of other mode, is usually 0.004 mol or more, preferably 0.005 mol or more, more preferably 0.006 mol or more, and usually 0.1 mol or less, preferably 0.05 mol or less, more preferably 0.03 mol or less, further preferably 0.025 mol or less, particularly preferably 0.023 mol or less, still further preferably 0.022 mol or less, under the assumption that the entire scintillator corresponds to 1 mol.

The value is within the range, and thus the scintillator, which can be reduced in absorption of light by the scintillator and has high translucency, can be obtained.

The reason why the values of a+b and [a+(b×1.8)] are preferably within the above ranges is presumed as follows.

In other words, both the substitution element A and the activator element B are elements different from the main component of Q or M, and such ion radii are not matched in most cases.

Thus, it is considered that the substitution element A and the activator element B, even when included in any of Q and M, can be used in appropriate amounts to thereby not only exert the effects of the respective elements as much as possible, but also reduce crystal strain and enhance stability of the crystal structure.

<Impurities>

(Zr)

The scintillator represented by the general formula (1) may contain Zr as an impurity. Zr may be present as any mode, in the scintillator, and may be included in, for example, any one of Q or M, or both Q and M. In other words, one site or both sites of Q and M may be substituted with Zr. Whether Q or M is substituted with any of impurities including Al and Mg described below can be confirmed with a mode of substitution, as in the above activator element B, by using ZAFS, ZANES or the like to perform comparison with a spectrum of a reference element and thus analyze the charge state of a target element, and its surrounding state.

The content of Zr in the scintillator is usually 100 ppm by mass or more and 50000 ppm by mass or less, preferably 1500 ppm by mass or more, more preferably 1800 ppm by mass or more, further preferably 2000 ppm by mass or more, particularly preferably 4500 ppm by mass or more, and is preferably 21000 ppm by mass or less, more preferably 18000 ppm by mass or less, further preferably 15000 ppm by mass or less, particularly preferably 12000 ppm by mass or less, still further preferably 8000 ppm by mass or less, most preferably 5000 ppm by mass or less. The content of Zr is equal to or more than the lower limit, and thus the scintillator, which exhibits favorable afterglow characteristics and favorable translucency, is easily obtained. The content of Zr is equal to or less than the upper limit, and thus the afterglow intensity with Zr is not too high and appropriate afterglow characteristics are obtained.

The content of Zr can be adjusted by controlling the amount of addition of Zr (or Zr-containing compound) which can be added as a raw material, or can also be adjusted by selecting other raw material than Zr (or Zr-containing compound) from the viewpoint of the content of impurities in a case where Zr is included in such other raw material as an impurity, or the control of the amount of addition of Zr (or Zr-containing compound) and the selection of such other raw material can be combined.

Herein, the scintillator, which contains Zr in a preferred range, can be obtained by appropriately adjusting the ratio of the raw material, the ratio of each element in mixing of the raw material, addition of the Zr compound, and conditions of the production method.

(Al)

The scintillator represented by the general formula (1) may contain Al as an impurity. The content of Al in the scintillator is usually 1500 ppm by mass or less, preferably 1200 ppm by mass or less, more preferably 1000 ppm by mass or less, and furthermore preferably 800 ppm by mass or less, 500 ppm by mass or less, 200 ppm by mass or less or 100 ppm by mass or less. The lower limit of the content of Al is not particularly limited, no Al may be contained, and the lower limit is usually 1 ppm by mass or more because Al can be contained as an impurity. The content of Al is within the above range, and thus the scintillator, which exhibits favorable light emission characteristics and translucency, can be obtained.

Al may be present, as any mode, in the scintillator, and may be included in, for example, any one of Q or M, or both Q and M. In other words, one site or both sites of Q and M may be substituted with Al.

The content of Al can be adjusted by controlling the amount of addition of Al (or Al-containing compound) which can be added as a raw material, or can also be adjusted by controlling the purity of other raw material than Al (or Al-containing compound) in a case where Al is included as an impurity in such other raw material, or the control of the amount of addition of Al (or Al compound) and selection of such other raw material can be combined, or furthermore the content of Al can also be decreased by a common impurity removal method.

Since Al may also be incorporated from a tool and an instrument or a surrounding environment, during production, the content of Al can also be adjusted to a preferred content by avoiding use of a tool and an instrument which can contain Al or in which Al is adopted, or avoiding the environment in which Al can be incorporated, in the course of production, and any combination thereof.

(Mg)

The scintillator represented by the general formula (1) may contain Mg as an impurity, and the content of Mg in the scintillator is preferably 100 ppm by mass or less, preferably 90 ppm by mass or less, more preferably 80 ppm by mass or less, further preferably 60 ppm by mass or less, 40 ppm by mass or less, 20 ppm by mass or less or 10 ppm by mass or less. The lower limit of the content of Mg is not particularly limited, no Mg may be contained, and the lower limit is usually 1 ppm by mass or more because Mg can be contained as an impurity. The content of Mg is within the above range, and thus the scintillator, which exhibits favorable light emission characteristics and translucency, can be obtained.

Mg may be present as any mode, in the scintillator, and may be included in, for example, any one of Q or M, or both Q and M. In other words, one site or both sites of Q and M may be substituted with Mg.

The content of Mg can be adjusted by controlling the amount of addition of Mg (or Mg-containing compound) which can be added as a raw material, or can also be adjusted by controlling the purity of other raw materials than Mg (or Mg-containing compound) in a case where Mg is included as an impurity in such other raw material, or the amount of addition of Mg (or Mg-containing compound) and selection of such other raw material can also be combined, or furthermore the content of Mg can also be decreased by a common impurity removal method.

Since Mg may also be incorporated from a tool and an instrument or a surrounding environment, during production, the content of Mg can also be adjusted to a preferred content by avoiding use of a tool and an instrument which can contain Mg or in which Mg is adopted, or avoiding the environment in which Mg can be incorporated, in the course of production, and any combination thereof.

The scintillator represented by the general formula (1) can contain still other element as long as the effects of the present invention are not impaired.

The method for analyzing each element included in the scintillator is not particularly limited, and can be, for example, a procedure of whole elemental analysis with glow discharge mass spectroscopy (GDMS).

<Mode and Shape of Scintillator>

The form of the scintillator is not particularly limited, can be appropriately selected depending on each application and object, and can also be any form, for example, a powder, single crystal, polycrystal, or sintered body form, in particular, a powder, single crystal, or sintered body form. Among them, the form of the scintillator is preferably not a powder form, and is preferably a single crystal or sintered body form. For example, in a case where the scintillator is used in a PET apparatus, a single crystal or a sintered body is preferred, in a case where the scintillator is used in an X-ray CT apparatus, a single crystal or a sintered body is preferred, and in a case where the scintillator is used in an X-ray detection film for non-destructive inspection, a film is preferably used in which a powder is dispersed in a resinous sheet.

The shape of the scintillator is not particularly limited, and is preferably a shape having radiation incident surface and emitting surface and having a certain height between the radiation incident surface and emitting surface. The radiation incident surface and emitting surface are preferably in parallel with each other.

Furthermore, the shape is preferably a columnar shape, a flat plate shape or a curved plate shape.

The height of the shape is usually 0.5 mm or more, preferably 1 mm or more, more preferably 3 mm or more, further preferably 5 mm or more, particularly preferably 10 mm or more, still further preferably 15 mm or more, and the upper limit is not particularly limited, can be appropriately set depending on an instrument, an apparatus or the like in which the scintillator is utilized, and is usually 100 mm or less. Herein, the "height" of a flat plate shape or a curved plate shape means the thickness.

<Various Characteristics of Scintillator>

The linear transmittance of light at a wavelength of 390 nm at a thickness of 1.9 mm of the scintillator is not particularly limited, and is usually 1% or more, preferably 2% or more, more preferably 3% or more, further preferably 5% or more, particularly preferably 10% or more, still further preferably 20% or more, extremely preferably 30% or more, most preferably 40% or more, the upper limit is not particularly limited and is usually 100% or less, and the transmittance is more preferably high as much as possible because the higher the linear transmittance of light at a wavelength of 390 nm is, fluorescence is more efficiently detected.

The linear transmittance of light at a wavelength of 390 nm at a thickness of 1.0 mm of the scintillator is not particularly limited, and is usually 2% or more, preferably 5% or more, more preferably 10% or more, further preferably 30% or more, particularly preferably 40% or more, still further preferably 50% or more, extremely preferably 70% or more, most preferably 60% or more, the upper limit is not particularly limited and is usually 100% or less, and is more preferably high as much as possible for the same reason as in the case of a thickness of 1.9 mm.

The method for enhancing the linear transmittance of light at a wavelength of 390 nm is not particularly limited, and, for example, a method for removing impurities in the course of production, a method for decreasing crystal defects by prevention of rapid crystal growth, or a method for repairing crystal defects by an annealing step or the like described below, after production, can be used.

The linear transmittance of light at a wavelength of 800 nm at a thickness of 1.9 mm of the scintillator is usually 5% or more, preferably 30% or more, further preferably 40% or more, particularly preferably 50% or more, most preferably 60% or more, and the upper limit is not particularly limited and is usually 100% or less, and is more preferably high as much as possible because a higher linear transmittance of light at a wavelength of 390 nm means less scattering and results in an enhancement in detection efficiency of fluorescence.

The linear transmittance of light at a wavelength of 800 nm at a thickness of 1.0 mm of the scintillator is usually 5% or more, preferably 30% or more, further preferably 40% or more, particularly preferably 50% or more, still further preferably 60% or more, extremely preferably 70% or more, most preferably 80% or more, and the upper limit is not particularly limited and is usually 100% or less, and is more preferably high as much as possible.

The method for enhancing the linear transmittance of light at a wavelength of 800 nm is not particularly limited, and, for example, a method for adding an appropriate amount of the activator element B or a method for preventing voids from being generated in a crystalline texture can be used.

The linear transmittance of light (also simply referred to as "light transmittance") can be measured by a method described in Examples below.

In a case where the thickness of the scintillator is more than a predetermined thickness, for example, 1.9 mm or 1.0 mm, a measurement subject of the light transmittance is produced by processing for decreasing the thickness of the scintillator to a predetermined thickness, and in a case where the thickness of the scintillator is less than a predetermined thickness, a measurement subject of the light transmittance is produced by stacking of the scintillator until the thickness reaches a predetermined thickness or more and then processing for decreasing the thickness to a predetermined thickness. The processing can be carried out by a known method capable of decreasing the thickness of the scintillator, and can be, for example, processing by cutting out to a thickness slightly thicker than a predetermined thickness with a dicer. In this case, the scintillator cut out is ground and processed with a grinding machine. The processing can be made with the grain size of a grinding stone used in the grinding and processing being finely modified, to thereby process a scintillator surface to a flat surface with few irregularities.

The fluorescence decay time of the scintillator is not particularly limited, and can be measured by, for example, the same method and conditions as in measurement of the fluorescence decay time in Experimental Examples described below, the fluorescence decay time of the scintillator, in the case of measurement by this method, is usually 30 ns or less, preferably 20 ns or less, more preferably 18 ns or less, further preferably 14 ns or less, particularly preferably 11 ns or less, and the lower limit value is not particularly limited and is usually 0.1 ns or more as long as it is within the range of the response speed of a light detector during use in a radiation detection application.

The scintillator is preferably excited by irradiation with ionizing radiation to emit light in the wavelength region of 160 nm to 700 nm. The scintillator preferably shows a light emission peak in the range of 300 nm to 500 nm or less. Examples of the ionizing radiation include X-ray, γ-ray, α-ray, and neutron ray.

The fluorescence intensity at a time point after 100 ns from a time point at which the fluorescence intensity in irradiation of the scintillator with γ-ray reaches the maximum value is usually 4% or less, preferably 3% or less, more preferably 2% or less under the assumption that the maximum value of the fluorescence intensity is 100%, and the lower limit value is not particularly limited and is usually 0% or more. A smaller fluorescence intensity after 100 ns from a time point at which the fluorescence intensity reaches the maximum value means a faster fluorescence decay of the scintillator, and a sufficiently short fluorescence decay time can be secured as long as the fluorescence intensity is equal to or less than the upper limit.

The fluorescence intensity can be measured by a method described in Experimental Examples below.

The scintillator preferably has no deliquescence. The scintillator, which has the composition satisfying the general formula (1), can be used to thereby obtain the scintillator, which has no deliquescence.

The effective atomic number ($Z_{eff}$) of the scintillator is usually 50 or more, preferably 53 or more, more preferably 56 or more, further preferably 60 or more, and the upper limit is not particularly limited and is usually 100 or less. The effective atomic number of the scintillator is within the above range, and thus the scintillator, which has high radiation stopping power, and high radiation absorption efficiency and radiation detection efficiency, can be obtained.

The density of the scintillator is usually 5.5 $g/cm^3$ or more, preferably 6.0 $g/cm^3$ or more, more preferably 6.5 $g/cm^3$ or more, further preferably 7.0 $g/cm^3$ or more, most preferably 7.5 $g/cm^3$ or more. The upper limit is not particularly limited and is usually 20 $g/cm^3$ or less. The density is within the above range, and thus the scintillator, which has high radiation stopping power, and high radiation absorption efficiency and radiation detection efficiency, can be obtained. The scintillator density can be measured by a method in Experimental Examples described below.

[Method for Producing Scintillator]

The method for producing the above scintillator (also referred to as "the present production method") is not particularly limited, and examples thereof include a method including a raw material mixing step of weighing a raw material so that an objective composition is obtained, and sufficiently mixing the resultant to thereby obtain a raw material mixture; and a synthesis step of packing the raw material mixture obtained, in a heat-resistant container, and performing heat treatment at a predetermined temperature under a predetermined atmosphere, to thereby obtain a synthetic powder; and suitably further including a pressure-molding step of pressure-molding the synthetic powder obtained, to thereby obtain a pressure-molded body; and a firing step of firing the pressure-molded body obtained, at a predetermined temperature under a predetermined atmosphere, and, if necessary, processing and washing a fired product, to thereby obtain a sintered body. Hereinafter, one example of the method for producing the scintillator is described.

<Raw Material Preparation Step>

The present production method may include a step of preparing a raw material (raw material preparation step). Such a raw material used is not particularly limited as long as the above scintillator can be produced, and, for example, oxide, hydroxide, halide and/or mineral acid salt of each constituent atom can be used. Each compound may be an anhydride or a hydrate. Hereinafter, examples of non-limiting compounds with respect to some elements which can be utilized in any embodiment are shown.

For example, $BaCO_3$ can be used with respect to Ba, the purity of $BaCO_3$ is usually 90% by mol or more, preferably 99% by mol or more, and the upper limit is not particularly limited.

For example, $CaCO_3$ can be used with respect to Ca, the purity of $CaCO_3$ is usually 90% mol or more, preferably 99% by mol or more, and the upper limit is not particularly limited.

For example, $SrCO_3$ can be used with respect to Sr, the purity of $SrCO_3$ is usually 90% mol or more, preferably 99% by mol or more, and the upper limit is not particularly limited.

For example, $HfO_2$ can be used, as a raw material, with respect to Hf, the purity of $HfO_2$ in the raw material is usually 99.999% by mol or less, preferably 99.9% by mol or less, more preferably 99.0% by mol or less, and usually 90% by mol or more. The purity is equal to or less than the upper limit, in particular, 99.0% by mol or less, and thus sintering favorably progresses and the scintillator, which is a sintered body and has high translucency, can be obtained. The purity is equal to or more than the lower limit, and thus the scintillator, which exhibits a short fluorescence decay time, can be obtained. $HfO_2$ having the above purity can be used as a raw material, to thereby allow for use of a more inexpensive raw material and inexpensive production of the scintillator.

For example, $La_2O_3$, $LaF_3$, $LaCl_3$, $La(NO_3)_3$, or $(CH_3COO)_3La$, and a hydrate of each compound can be used with respect to La, the purity of such a raw material is usually 90% by mol or more, preferably 99% by mol or more, and the upper limit is not particularly limited.

Zr contained as an impurity in a small amount in a raw material, for example, $HfO_2$ may be utilized as it is, with respect to Zr, or a Zr compound may be separately added. The Zr compound is not particularly limited, and, for example, $ZrO_2$ or $Zr_2O_3$ can be used. The content of Zr contained in $HfO_2$ described above is not particularly limited, and is usually 100 ppm by mass or more, preferably 500 ppm by mass or more, more preferably 1000 ppm by mass or more, further preferably 1500 ppm by mass or more, and is usually 10% by mass or less, may be 50000 ppm by mass or less, may be 30000 ppm by mass or less, may be 21000 ppm by mass or less, may be 18000 ppm by mass or less, or may be 10000 ppm by mass or less. When Zr contained as an impurity in a raw material is utilized, a higher purity of the raw material tends to lead to a lower content of Zr. However, the purity of the raw material and the content of Zr contained as an impurity do not completely work with each other, and are varied depending on the type of the raw material and a production process, and, for example, there may be a case where the purity is high and the content of Zr contained as an impurity is low, or a case where the purity is high and the content of Zr contained as an impurity is high.

For example, $CeO_2$, $CeI_3$, $Ce_2O_3$, or $Ce(NO_3)_3$ can be used with respect to Ce, the purity of such a raw material is usually 90% by mol or more, preferably 99% by mol or more, and the upper limit is not particularly limited.

For example, $Al_2O_3$ can be used with respect to Al, the purity of $Al_2O_3$ is usually 90% by mol or more, preferably 99% by mol or more, and the upper limit is not particularly limited. While Al can be contained in a trace amount as an impurity in each raw material other than Al (or Al compound), the content of Al in such each raw material (except for Al or Al compound) is usually 1 ppm by mass or less to about several tens of ppm by mass, and thus an appropriate raw material can be selected to thereby suppress the content of Al contained in a raw material mixture after mixing of such a raw material, to a sufficiently low content.

For example, $3MgCO_3\cdot Mg(OH)_2\cdot 3H_2O$ can be used with respect to Mg, the purity of $3MgCO_3\cdot Mg(OH)_2\cdot 3H_2O$ is usually 90% by mol or more, preferably 99% by mol or more, and the upper limit is not particularly limited. While Mg can be contained in a trace amount as an impurity in each raw material other than Mg (or Mg compound), the content of Mg in such each raw material (except for Mg or Mg compound) is usually 1 ppm by mass or less, or about several tens of ppm by mass or more. An appropriate raw material can be selected to thereby suppress the content of Mg contained in a raw material mixture after mixing of such a raw material, to a sufficiently low content.

<Raw Material Mixing Step>

The present production method includes a step of mixing a raw material to obtain a raw material mixture (raw material mixing step). The raw material mixing method is not particularly limited, a method commonly used can be applied, and examples thereof include a dry mixing method and a wet mixing method.

Examples of the dry mixing method include mixing by use of a ball mill or the like.

Examples of the wet mixing method include a method including adding a solvent or a dispersion medium such as water to a raw material, mixing the resultant by use of a mortar and a pestle to provide a dispersion solution or slurry, and drying it by, for example, spray drying, drying by heating, or air drying.

The composition of the scintillator finally obtained is basically matched with the ratio of each element in the raw material mixing step, and thus the ratio of each element in raw material mixing can be matched with an objective ratio in the scintillator, to thereby obtain the scintillator, which has an objective composition.

<Synthesis Step>

The present production method includes a step of heat-treating the raw material mixture to thereby obtain a synthetic powder (synthesis step). The raw material mixture can be packed in a heat-resistant container such as a crucible or a tray, and heat-treated, to thereby obtain a synthetic powder. The material of the heat-resistant container is not particularly limited as long as it is low in reactivity with each raw material, and examples thereof include a platinum-based container of, for example, Pt, Pt/Rh (30% by weight), or Ir. The atmosphere in the heat-treating is not particularly limited, and examples thereof include a reducing atmosphere such as a hydrogen atmosphere and a hydrogen-noble gas-mixed atmosphere; and an air atmosphere. In a case where the heat-treating is performed under a reducing atmosphere, a Mo- or W-based container or the like can also be used, besides a platinum-based container.

The temperature and the time in the heat-treating are not particularly limited as long as the above scintillator is obtained, and are preferably a temperature and a time which allow for sufficient reaction of a raw material mixed. The temperature is usually 900° C. or more, preferably 1000° C. or more, and usually 2000° C. or less, preferably 1800° C. or less. The time is usually 1 hour or more, preferably 3 hours or more, usually 50 hours or less.

The synthetic powder obtained in the present synthesis step may also be utilized in order to obtain a sintered body in a pressure-molding step, a pre-firing step, a firing step and/or the like described below, or can also be utilized as it is, as a powder scintillator.

Herein, the composition of such a sintered body can be more certainly regulated in a preferred range by confirming whether or not the composition of the synthetic powder satisfies a preferred range, before such a sintered body is obtained in a step described below.

The synthetic powder obtained in the present synthesis step may be sieved. The mesh size (opening) of the sieve is usually 500 μm or less, preferably 200 μm or less. The sieving can eliminate powder aggregation, to allow a uniform-quality scintillator to be obtained.

<Pressure-Molding Step>

The present production method may include a step of pressure-molding the synthetic powder obtained in the synthesis step, to thereby obtain a pressure-molded body (pressure-molding step). The method and conditions of pressure-molding are not particularly limited, and, the method can be performed by, for example, uniaxial pressure press or cold hydrostatic pressure press. The pressure in the pressure-molding may be, for example, 10 MPa or more, preferably 30 MPa or more. The pressure-molding is appropriately performed to thereby reduce voids after sintering and improve translucency. The scintillator, which enhanced in density after sintering and which has high radiation stopping power, can be obtained.

<Pre-Firing Step>

The present production method may include a step of pre-firing the synthetic powder obtained in the synthesis step, or the pressure-molded body obtained in the pressure-molding step to thereby obtain a pre-fired product (pre-firing step). The temperature, the pressure, the time and the atmosphere in the pre-firing are not particularly limited as long as the above scintillator is obtained, and the pre-firing temperature is usually 1200° C. or more, preferably 1300° C. or more, and usually 2000° C. or less, preferably 1800° C. or less. The pre-firing pressure is usually $10^{-5}$ Pa or more, preferably $10^{-3}$ Pa or more, and usually 10 MPa or less, preferably 2 MPa or less. The pre-firing time is usually 1 hour or more, preferably 2 hours or more, and usually 50 hours or less. The atmosphere is preferably an argon atmosphere, or an inert atmosphere such as a nitrogen atmosphere.

<Firing Step>

The present production method may include a step of pressurizing and further heating (firing) the synthetic powder obtained in the synthesis step, the pressure-molded body obtained in the pressure-molding step, or the pre-fired product obtained in the pre-firing step, to thereby obtain a fired product (sintered body) (firing step). The pressurizing method and conditions are not particularly limited, and, for example, the pressurizing can be made by a hot isostatic pressing method (HIP). A hot press treatment may also be introduced before the firing.

The firing conditions are not particularly limited as long as the above scintillator is obtained, and the firing temperature is usually 1200° C. or more, preferably 1300° C. or more, and usually 2000° C. or less, preferably 1800° C. or less. The firing pressure is usually 10 MPa or more, preferably 50 MPa or more, and usually 300 MPa or less, preferably 200 MPa or less. The firing time is usually 0.5 hours or more, preferably 1 hour or more, and usually 20 hours or less, preferably 10 hours or less. The temperature, the pressure, and the time are appropriately adjusted, and thus the scintillator, which is enhanced in density after sintering and which has high radiation stopping power, can be obtained.

The atmosphere in the firing is not particularly limited as long as the above scintillator is obtained, and the firing is preferably performed under an appropriately suited atmosphere in consideration of stabilities of the material, the reaction container, the furnace material and the like. Specific examples of the atmosphere include an inert atmosphere such as an argon atmosphere or a nitrogen atmosphere.

The firing step optionally includes, for example, a pretreatment step (step of performing washing, drying, vacuum deaeration, and/or the like) or a post-treatment step (step of performing washing, drying, and/or the like).

<Annealing Step>

The present production method may include a step of annealing the fired product for the purpose of repair of crystal defects (annealing step), after the firing step, although, when the scintillator is obtained as a sintered body, the fired product obtained in the firing step may be adopted as it is, as the sintered body. The annealing is performed to thereby reduce absorption of light by crystal defects, and thus a sintered body having higher translucency can be obtained.

Various conditions, for example, the temperature, the pressure, the time, and the atmosphere in the annealing step are not particularly limited as long as the above scintillator is obtained, and the annealing temperature is usually 1000° C. or more, preferably 1200° C. or more, and usually 1500° C. or less. The annealing pressure is usually 0.01 MPa or more, preferably MPa or more, more preferably 0.1 MPa or more, and usually 300 MPa or less, preferably 200 MPa or less. The annealing time is usually 0.5 hours or more, preferably 1 hour or more, and usually 20 hours or less, preferably 10 hours or less. The atmosphere is preferably an inert atmosphere such as an argon atmosphere or a nitrogen atmosphere.

<Single Crystal Growth Step>

In a case where the scintillator is obtained as a single crystal, the single crystal can be produced by, for example, heating and melting the sintered body obtained in the firing step or the annealing step, and growing the single crystal from a molten liquid. The container and the atmosphere in production of the single crystal can be appropriately selected from the same viewpoint as in production of the sintered body. The single crystal growth method is not particularly limited, and, for example, a common Czochralski method, Bridgman method, micro-pull down method, EFG method or zone melting method can be used. A flux method or the like can also be used for the purpose of a reduction in melting point. In a case where a large crystal is grown, a Czochralski method or a Bridgman method is preferable.

The method for obtaining the above scintillator as a powder is not particularly limited, and examples thereof include a method for obtaining the synthetic powder obtained in the synthesis step, as it is, as a powder scintillator; a method including pulverizing the sintered body obtained in the firing step or the annealing step; and a method including pulverizing the single crystal obtained in the single crystal growth step. The pulverizing method is not particularly limited.

[Application of Scintillator]

The above scintillator is not particularly limited in terms of application, and can be preferably used in a radiation detector. The radiation detector can be used, for example, in the fields of radiation medicine, physics, physiology, chemistry, mineralogy, and furthermore petroleum exploration, for example, for positron CT (PET) for medical diagnosing, for cosmic radiation observation, and underground resource searching.

In the case of use in a radiation detector application, the form of the above scintillator is not particularly limited, and can be any of powder, single crystal, and sintered body forms. The above scintillator can be combined with an optical receiver and thus used as a radiation detector. Examples of the optical receiver used in the radiation detector include a position detection photomultiplier tube (PS-PMT), a silicon photomultiplier (Si-PM), a photodiode (PD) or an avalanche-photodiode (APD).

The radiation detector including the above scintillator can also be used as a radiation inspection apparatus. Examples of the radiation inspection apparatus including the radiation detector include an inspection apparatus for non-destructive inspection, such as a detector for non-destructive inspection, a detector for resource searching, or a detector for high energy physics, or a diagnosis apparatus such as a medical image processing apparatus. Examples of the medical image processing apparatus include a positron emission tomography (PET) apparatus, X-ray CT, or SPECT. Examples of the form of PET include two-dimensional PET, three-dimensional PET, time-of-flight (TOF) PET, or depth detection (DOI) PET. These can also be used in combination.

EXAMPLES

Hereinafter, the present invention is described with reference to Experimental Examples in more detail, but the present invention is not limited only to the following Experimental Examples.

Experimental Example 1

$BaCO_3$ (purity 99.99% by mol), $La_2O_3$ (purity 99.9% by mol) and $HfO_2$ (purity 98% by mol, containing Zr as an impurity, content of Zr in $HfO_2$, 4500 ppm by mass) were respectively prepared as raw materials of Ba, La and Hf. The respective raw materials were mixed so that the molar ratio of each element, Ba:La:Hf, was 99:1:100, and thus a powdery raw material mixture was obtained. The raw material mixture obtained was heat-treated at 1150° C. under an air atmosphere for 12 hours, and thus a synthetic powder (powder scintillator) was obtained. The synthetic powder obtained was applied to a sieve with an opening of 106 μm, to provide a raw material of a sintered body scintillator. The raw material obtained was subjected to uniaxial pressure press at 40 MPa for one minute and cold hydrostatic pressure press at 170 MPa for one minute, and thus a pressure-molded body was obtained. The pressure-molded body obtained was retained at 1600° C. under a nitrogen stream (1 L/min) for 6 hours to perform pre-firing. Finally, a sintered body scintillator was obtained by firing at a temperature of 1600° C. and a pressure of 100 MPa under a nitrogen atmosphere, according to a hot isostatic pressing method (HIP), for 2 hours.

Experimental Examples 2 to 8

Sintered body scintillators according to Experimental Examples 2 to 8 were each obtained in the same manner as in Experimental Example 1 except that $CeO_2$ (purity 99.99% by mol) was, if necessary, used as a Ce raw material and the respective raw materials were mixed so that the molar ratio of each element, Ba:Ce:La:Hf, was as described in Table 1.

[Evaluation of Scintillator]

<Measurement of Density of Scintillator>

The scintillators according to Experimental Examples 1 to 8 were each air-dried at room temperature, and the density was measured with a balance (AUW220D manufactured by Shimadzu Corporation) and a specific gravity measurement kit (SMK-401 manufactured by Shimadzu Corporation) under a room temperature environment. The results are shown in Table 1.

<Evaluation of Translucency>

The translucency of each of the sintered body scintillators according to Experimental Examples 1, 2, 6 and 8 was evaluated with U-3310 manufactured by Hitachi High-Tech Science Corporation. The linear transmittance was measured by fixing a specimen of 8.3 mmφ×1.9 mm thickness to a black jig containing a 1-mmφ pinhole opened, with a transparent tape, and allowing the black jig to which the specimen was fixed, to be closely contacted with an integrating sphere so that the pinhole was located at the center of incident light from U-3310. The influence of scattering was evaluated in terms of the transmittance at 800 nm. Two samples with respect to each condition were produced, and the respective average values were calculated. The results are shown in Table 1.

TABLE 1

| | Molar ratio in mixing | | | | Density/% | Thickness/mm | 800 nm Transmittance/% |
|---|---|---|---|---|---|---|---|
| | Ba | Ce | La | Hf | | | |
| Experimental Example 1 | 100 | 0.0 | 1.0 | 99 | 99.9 | 1.9 | 47 |
| Experimental Example 2 | 99 | 1.0 | 0.0 | 100 | 100.7 | 1.9 | 48 |
| Experimental Example 3 | 99 | 1.0 | 0.001 | 100 | 100.1 | 1.9 | No Data |
| Experimental Example 4 | 99 | 1.0 | 0.01 | 100 | 100.0 | 1.9 | No Data |
| Experimental Example 5 | 99 | 1.0 | 0.1 | 99.9 | 100.0 | 1.9 | No Data |
| Experimental Example 6 | 99 | 1.0 | 0.2 | 99.8 | 99.9 | 1.9 | 55 |
| Experimental Example 7 | 99 | 1.0 | 0.3 | 99.7 | 99.9 | 1.9 | No Data |
| Experimental Example 8 | 99 | 1.0 | 0.5 | 99.5 | 99.2 | 1.9 | 53 |

As shown in Table 1, the scintillator according to Experimental Example 1, where the substitution element A (La) was added, had a density of almost 100% and exhibited favorable translucency. The appearance thereof was also transparent.

Each of the scintillators of Experimental Examples 2 to 8, containing the activator element B (Ce), also contained the substitution element A and thus was improved in transmittance at 800 nm, as compared with that of Experimental Example 1.

Experimental Examples 9 to 22

Sintered body scintillators were each obtained in the same manner as in Experimental Example 1 except that the respective raw materials were mixed so that the molar ratio of each element, Ba:Ce:La:Hf, was as described in Table 2.

Reference Examples 1 to 2

Sintered body scintillators were each obtained in the same manner as in Experimental Example 1 except that Lu was used as the substitution element, instead of La, and $Lu_2O_3$ (manufactured by Shin-Etsu Chemical Co., Ltd., purity 99.99%) was used as a Lu raw material, and each raw material was mixed so that the molar ratio of each element, Ba:Ce:Lu:Hf, was as described in Table 3.

Here, a common general knowledge according to isotopes and radioactivities of Lu and La is described for reference.

Lu contains radioisotope $^{176}Lu$ at a natural abundance ratio of 2.59% (Reference Literature 1). The radioisotope produces beta decay, and emits internal background radiation at 307 keV and 202 keV, according to the beta decay (for example, Reference Literature 2). The background radiation can be observed apparently as radiation at 509 keV, and is hardly distinguished from gamma-ray at 511 keV, as an observation subject in a PET apparatus.

On the other hand, La contains 99.91% of stable isotope $^{139}La$, and background radiation is negligibly small (Reference Literature 1).

Reference Literature 1: Isotopic compositions and standard atomic masses from Atomic weights of the elements. Review 2000 (IUPAC Technical Report). Pure Appl. Chem. Vol. 75, No. 6, pp. 683-800, (2003) and Atomic Weights Revised (2005)

Reference Literature 2: H. Rothfuss, V. Panin, +5 authors M. Casey, 2013 IEEE Nuclear Science Symposium and Medical Imaging Conference (2013 NSS/MIC)

The density and the linear transmittance at a wavelength of 800 nm, of each of the scintillators obtained, were measured in the same manner as in Experimental Example 1. The linear transmittance at a wavelength of 390 nm was also measured by the same method as in measurement of the linear transmittance at a wavelength of 800 nm, in order to evaluate the influence of absorption. The results in Experimental Examples 9 to 22 are shown in Table 2. The results in Reference Examples 1 to 2 are shown in Table 3.

FIG. 1 illustrates a relationship between the sum "a+b" of the molar content a of the substitution element A and the total content b of the activator element B in each of Experimental Examples, and the linear transmittance at a wavelength of 800 nm.

Figure 2:
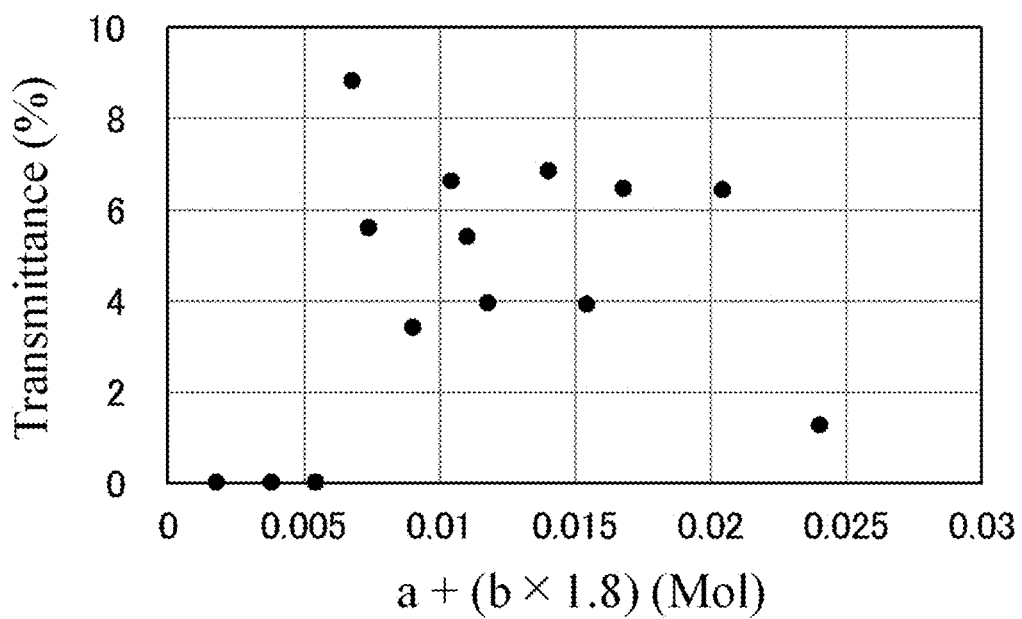
FIG. 2 is a graph illustrating a relationship between the value of [a+(b×1.8)] and the linear transmittance of light at a wavelength of 390 nm, at a thickness of 1.9 mm, with respect to a scintillator obtained in Examples.

FIG. 2 illustrates a relationship between the value of [a+(b×1.8)] derived from a and b described above, and the linear transmittance at a wavelength of 390 nm of the scintillator having a height of 1.9 mm.

Two samples with respect to each condition were produced, and the respective average values were calculated.

TABLE 2

|  | Molar ratio in mixing | | | | | | 800 nm | 390 nm |
|---|---|---|---|---|---|---|---|---|
|  | Ba | Ce | La | Hf | Density/% | Thickness/mm | Transmittance/% | Transmittance/% |
| Experimental Example1 9 | 99.5 | 0.5 | 0.0 | 100 | 97.4 | 1.9 | 25 | 3.4 |
| Experimental Example1 10 | 99.5 | 0.5 | 0.2 | 99.8 | 100 | 1.9 | 51 | 5.4 |
| Experimental Example1 11 | 99.5 | 0.5 | 0.5 | 99.5 | 98.3 | 1.9 | 63 | 6.8 |
| Experimental Example1 12 | 99.5 | 0.5 | 1.0 | 99 | 100 | 1.9 | 60 | 5.2 |
| Experimental Example1 13 | 99.7 | 0.3 | 0.0 | 100 | 95.8 | 1.9 | 0.2 | 0.0 |
| Experimental Example1 14 | 99.7 | 0.3 | 0.2 | 99.8 | 96.5 | 1.9 | 0.7 | 5.6 |
| Experimental Example1 15 | 99.7 | 0.3 | 0.5 | 99.5 | 100 | 1.9 | 56 | 6.6 |
| Experimental Example1 16 | 99.7 | 0.3 | 1.0 | 99 | 101 | 1.9 | 47 | 3.9 |
| Experimental Example1 17 | 99.7 | 0.3 | 1.5 | 98.5 | 99.7 | 1.9 | 57 | 6.4 |
| Experimental Example1 18 | 99.9 | 0.1 | 0.0 | 100 | 95.5 | 1.9 | 0.0 | 0.0 |
| Experimental Example1 19 | 99.9 | 0.1 | 0.2 | 99.8 | 92.2 | 1.9 | 1.6 | 0.0 |
| Experimental Example1 20 | 99.9 | 0.1 | 0.5 | 99.5 | 99.8 | 1.9 | 48 | 8.8 |
| Experimental Example1 21 | 99.9 | 0.1 | 1.0 | 99 | 101 | 1.9 | 38 | 3.9 |
| Experimental Example1 22 | 99.9 | 0.1 | 1.5 | 98.5 | 99.8 | 1.9 | 55 | 6.5 |

TABLE 3

|  | Molar ratio in mixing | | | | | | 800 nm | 390 nm |
|---|---|---|---|---|---|---|---|---|
|  | Ba | Ce | La | Hf | Density/% | Thickness/mm | Transmittance/% | Transmittance/% |
| Reference Example 1 | 99.7 | 0.3 | 0.5 | 99.5 | 90.6 | 1.9 | 0.1 | 0.0 |

TABLE 3-continued

|  | Molar ratio in mixing | | | | Density/% | Thickness/mm | 800 nm Transmittance/% | 390 nm Transmittance/% |
| --- | --- | --- | --- | --- | --- | --- | --- | --- |
|  | Ba | Ce | La | Hf |  |  |  |  |
| Reference Example 2 | 99.7 | 0.3 | 1.0 | 99 | 89.7 | 1.9 | 0.0 | 0.0 |

It can be seen as shown in Table 2 that, when scintillators contain the same content of the activator element B (in this case, Ce), a scintillator containing a small amount of the substitution element A (in this case, La) is improved in density and translucency as compared with a scintillator containing no substitution element A. It can also be seen that such a phenomenon is commonly found also in the case of the Ce content modified.

It can be seen as illustrated in FIG. 1, from one viewpoint, that a scintillator in which the value of a+b is within an appropriate range exhibits favorable transmittance of light at 800 nm and is reduced in scattering and improved in translucency.

It can be seen as illustrated in FIG. 2, from another viewpoint, that a scintillator in which the value of [a+(b× 1.8)] derived from a and b described above is within a predetermined range exhibits favorable transmittance of light at 390 nm and is reduced in absorption and improved in translucency.

Experimental Examples 23 to 26

Sintered body scintillators were each obtained in the same manner as in Experimental Example 1 except that the respective raw materials were mixed so that the molar ratio of each element, Ba:Ce:La:Hf, was as described in Table 4. Such scintillators were each then further heated at 1200° C. and 100 MPa under an atmosphere of a mixed gas of Ar+20% $O_2$, for 2 hours (annealing step). Finally, each sample was processed to a block shape of 5 mm×5 mm×1 mm thickness, and thus each scintillator was obtained.

The density of such each scintillator, before the annealing step, was evaluated in the same manner as in Experimental Example 1. The linear transmittances at a wavelength of 800 nm and at a wavelength of 390 nm, of such each scintillator after annealing, were measured in the same manner as in Experimental Example 1. Furthermore, the influence of self-absorption by the activator element B (in this case, Ce) was evaluated in terms of the transmittance at a wavelength of 330 nm. The results are shown in Table 4. Table 4 also shows the densities in Experimental Example 9 and Experimental Example 18, for reference.

<Evaluation of Light Emission Characteristics>

The light emission characteristics of each of the sintered body scintillators according to Experimental Examples 23 to 26 were evaluated. First, the fluorescence decay time (DT) was evaluated. A specimen having a thickness of 1 mm was covered with a polytetrafluoroethylene tape, and thereafter the specimen was attached to H7195 photomultiplier tube manufactured by Hamamatsu Photonics K.K., with Optoseal manufactured by Shin-Etsu Chemical Co., Ltd. The specimen was irradiated with γ-ray, with Cs-137 as an excitation source, and the fluorescence intensity was measured with MS054 5-BW-1000 oscilloscope manufactured by Tektronix Inc., at the time of irradiation with γ-ray and after the irradiation. The fluorescence decay time (DT) was calculated by fitting with a single exponential function, based on the fluorescence intensity.

The proportion of the fluorescence intensity after 100 ns from the time at which the fluorescence intensity reached the maximum value was calculated, under the assumption that the maximum value of the fluorescence intensity was 100%. Furthermore, the integrated intensity of a decay waveform was calculated, and the relative value of the overall light output was calculated.

Figure 3:
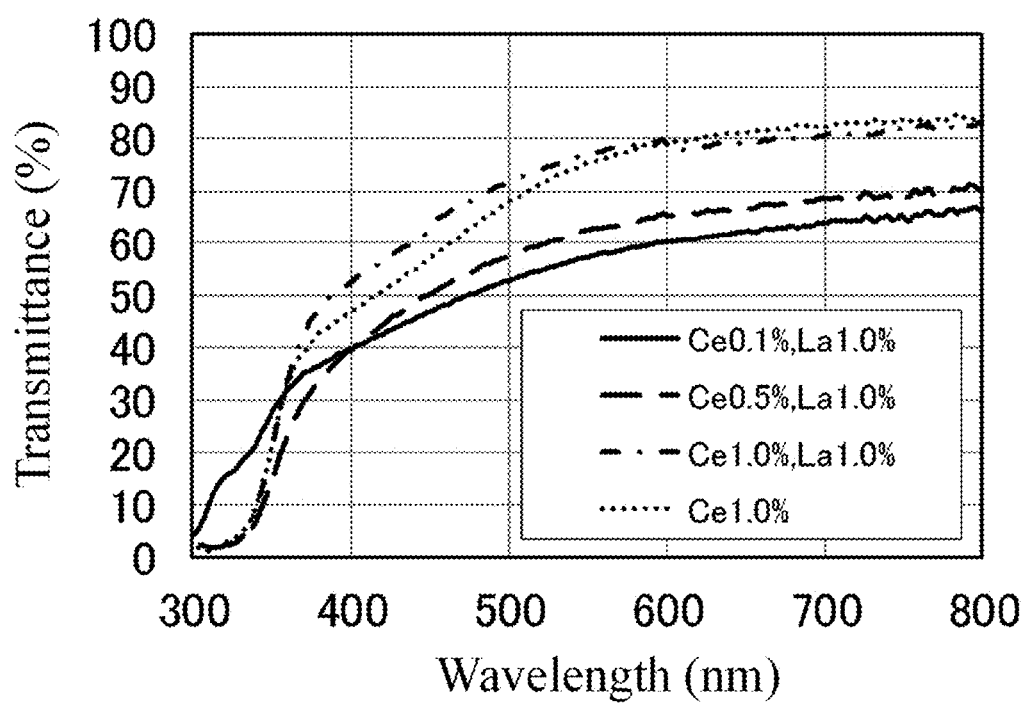
FIG. 3 is a graph illustrating a linear transmittance spectrum with respect to a scintillator obtained in Examples.
Figure 4:
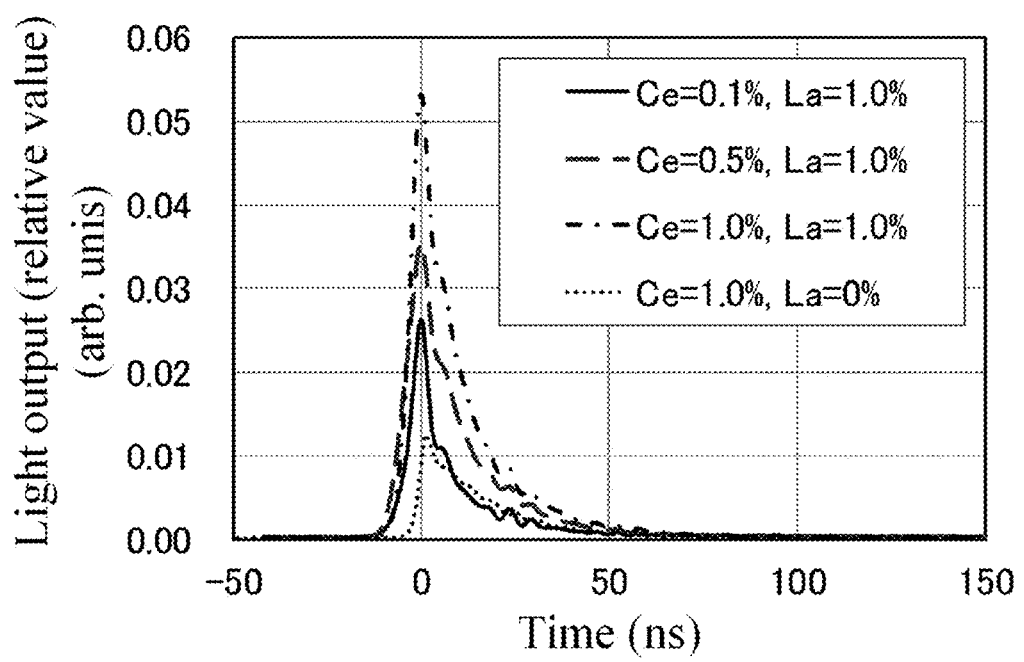
FIG. 4 is a diagram illustrating a fluorescence decay waveform with respect to a scintillator obtained in Examples.

The results are shown in Table 4. FIG. 3 and FIG. 4 respectively illustrate the linear transmittance spectrum and the fluorescence decay waveform, and the relative value of the light output, of each of the sintered body scintillators obtained in Experimental Examples 23 to 26.

TABLE 4

|  | Molar ratio in mixing | | | | Density/% | Thickness/mm | 800 nm Transmittance/% | 390 nm Transmittance/% | 330 nm Transmittance/% | DT/ns | Light emission intensity after 100 ns | Relative value of integrated value of light output |
| --- | --- | --- | --- | --- | --- | --- | --- | --- | --- | --- | --- | --- |
|  | Ba | Ce | La | Hf |  |  |  |  |  |  |  |  |
| Experimental Examples 23 | 99 | 1.0 | 0.0 | 100 | 100 | 1.0 | 86 | 46 | 5.2 | 14 | 1.2 | 1.0 |
| Experimental Examples 24 | 99 | 1.0 | 1.0 | 99 | 100 | 1.0 | 83 | 51 | 3.5 | 16 | 1.7 | 3.2 |
| Experimental Examples 9 | 99.5 | 0.5 | 0.0 | 100 | 97.4 |  |  |  | No Data |  |  |  |
| Experimental Examples 25 | 99.5 | 0.5 | 1.0 | 99 | 100 | 1.0 | 71 | 36 | 3.1 | 13 | 1.2 | 2.3 |
| Experimental Examples 18 | 99.9 | 0.1 | 0.0 | 100 | 95.5 |  |  |  | No Data |  |  |  |
| Experimental Examples 26 | 99.9 | 0.1 | 1.0 | 99 | 100 | 1.0 | 66 | 38 | 18 | 13 | 0.7 | 1.3 |

As shown in Table 4, all the scintillators according to Experimental Examples 25 and 26 each exhibited a higher density than a case of no La contained.

All the scintillators according to Experimental Examples 24 to 26 were more favorable in light output than that according to Experimental Example 23. Each of the scintillators according to Experimental Examples 25 and 26, although reduced in amount of a Ce atom at the light emission center, exhibited a light output exceeding that of the scintillator according to Experimental Example 23, and the scintillator according to Experimental Example 24, which was the same in amount of Ce as that of the scintillator according to Experimental Example 23, was enhanced in light output three times or more.

All the scintillators according to Experimental Examples 24 to 26 were favorable in translucency as in the scintillator according to Experimental Example 23, and the scintillator according to Experimental Example 26 was improved in linear transmittance at 330 nm, three times or more.

All the scintillators according to Experimental Examples 24 to 26 each exhibited a DT of 20 ns or less and a fluorescence intensity of 2% or less after 100 ns from the time point at which the maximum fluorescence intensity was achieved, with respect to time characteristics of fluorescence, and were favorable as in the scintillator according to Experimental Example 23.

As shown above, the scintillator satisfying the general formula (1) and containing an appropriate amount of the substitution element A was enhanced in density and translucency. All the cases where the activator element B (in this case, Ce) was used in various amounts each provided a scintillator having enhanced density and translucency, exhibiting favorable translucency, having a high light output, and exhibiting a short fluorescence decay time, by addition of an appropriate amount of the substitution element A.

In other words, the present invention can provide a scintillator where an appropriate amount of the substitution element A such as La is added and thus not only the effect of an activator element serving as a light emission center can be exerted as much as possible, but also any adverse effect such as deterioration in density can be eliminated and the density, the translucency and light emission characteristics are optimized depending on the objects.

While an embodiment where La is used as the substitution element A is exemplified in the present Example, the same effects can be expected even with, as the substitution element A, Na, Cd, Pb, Tl, Sm, or the like which is close to La in terms of the electron state and the ion radius.

While use of Ce as the activator element B is exemplified in the present Example, each element described above can be arbitrarily used as the activator element B for the purpose of, for example, adjustment of the light emission peak wavelength or optimization of the light emission spectrum, as described above.

As described above, the present invention can provide a scintillator exhibiting favorable translucency and having a high light output and a short decay time, and a method for producing the scintillator. The present invention can also provide a radiation detector and a radiation inspection apparatus each having a high light detection efficiency, by use of the scintillator.

What is claimed is:

1. A scintillator, having a composition represented by the following general formula (1), $$QM_xO_{3y} \qquad (1)$$

wherein

Q represents one or more elements selected from the group consisting of Ca, Sr and Ba;

M represents Hf, x and y respectively satisfy 0.5≤x≤1.5 and 0.7≤y≤1.5;

the scintillator:

comprises a substitution element A comprising at least La, and a total molar content of the substitution element A being 0.00001 mol or more and 0.05 mol or less in 1 mol of the scintillator, further comprises an activator element B, the activator element B being constituted from Ce, has a perovskite-type crystal structure, and exhibits a linear transmittance of light at a wavelength of 800 nm, at a thickness of 1.9 mm, of 30% or more.

2. The scintillator according to claim 1, wherein, when the total molar content of the substitution element A and the total molar content of the activator element B, contained in 1 mol of the scintillator, are designated respectively as a and b, a+b satisfies 0.0055 mol or more and 0.024 mol or less.

3. The scintillator according to claim 1, wherein, when the total molar content of the substitution element A and the total molar content of the activator element B, contained in 1 mol of the scintillator, are designated respectively as a and b, [a+(b×1.8)] satisfies 0.006 mol or more and 0.03 mol or less.

4. The scintillator according to claim 1, wherein the scintillator is a single crystal or a sintered body.

5. The scintillator according to claim 1, having a columnar shape, a flat plate shape or a curved plate shape, and having a height of 1 mm or more.

6. The scintillator according to claim 1, wherein a linear transmittance of light at a wavelength of 390 nm, at a thickness of 1.9 mm, is 3% or more.

7. The scintillator according to claim 1, wherein a fluorescence decay time is 20 ns or less.

8. The scintillator according to claim 1, wherein, when the maximum value of a fluorescence intensity in irradiation with γ-ray is 100%, a fluorescence intensity at a time point after 100 ns from a time point at which a fluorescence intensity reaches the maximum value is 3% or less.

9. A radiation detector comprising the scintillator according to claim 1.

10. A radiation inspection apparatus comprising the radiation detector according to claim 9.

11. The scintillator according to claim 1, Q represents Ca.

12. The scintillator according to claim 1, Q represents Sr.

13. The scintillator according to claim 1, Q represents Ba.

14. The scintillator according to claim 1, wherein Q and M are substituted with the substitution element A.

15. The scintillator according to claim 1, wherein Q and/or M is individually substituted with an element other than a substitution element A and an activator element B.

16. The scintillator according to claim 1, wherein Q and/or M is individually substituted with an element other than Q and M at a proportion of 20% by mol or less.

17. A method for producing a scintillator, the method comprising:

mixing a raw material to obtain a raw material mixture; and heat-treating the raw material mixture to obtain a synthetic powder, wherein the raw material contains at least HfO$_2$ having a purity of 99.0% by mol or less, and the scintillator is a scintillator represented by the following general formula (1), $$QM_xO_{3y} \qquad (1)$$

wherein

Q represents one or more elements selected from the group consisting of Ca, Sr and Ba, M represents Hf, x and y respectively satisfy $0.5 \leq x \leq 1.5$ and $0.7 \leq y \leq 1.5$;

the scintillator:

comprises a substitution element A comprising at least La, and a total molar content of the substitution element A being 0.00001 mol or more and 0.05 mol or less in 1 mol of the scintillator, further comprises as an activator element B, the activator element B being constituted from Ce, has a perovskite-type crystal structure and exhibits a linear transmittance of light at a wavelength of 800 nm, at a thickness of 1.9 mm, of 30% or more.

18. The method for producing a scintillator according to claim 17, further comprising:

pressure-molding the synthetic powder to obtain a pressure-molded body; and firing the pressure-molded body to obtain a fired product.

19. The method for producing a scintillator according to claim 17, further comprising:

pressure-molding the synthetic powder to obtain a pressure-molded body;

firing the pressure-molded body to obtain a fired product; and annealing the fired product, after the firing.

* * * * *